United States Patent
Ardalan et al.

(10) Patent No.: US 7,126,494 B2
(45) Date of Patent: *Oct. 24, 2006

(54) REMOTE ACCESS TO ELECTRONIC METERS USING A TCP/IP PROTOCOL SUITE

(75) Inventors: Sasan H. Ardalan, Cary, NC (US); David E. Van den Bout, Apex, NC (US)

(73) Assignee: Elster Electricity, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,723

(22) Filed: Jun. 7, 2004

(65) Prior Publication Data

US 2004/0218616 A1   Nov. 4, 2004

Related U.S. Application Data

(63) Continuation of application No. 09/975,582, filed on Oct. 10, 2001, now Pat. No. 6,747,981, which is a continuation of application No. 09/022,718, filed on Feb. 12, 1998, now Pat. No. 6,396,839.

(60) Provisional application No. 60/039,716, filed on Feb. 12, 1997.

(51) Int. Cl.
*G08C 19/00* (2006.01)

(52) U.S. Cl. ............................. 340/870.02; 379/106.07

(58) Field of Classification Search ........... 340/870.02, 340/870.11; 370/401; 379/106.07, 102.05, 379/93.11

See application file for complete search history.

(56) References Cited

U.S. PATENT DOCUMENTS 3,445,815 A   5/1969   Saltzberg et al. ........... 340/163

(Continued)

FOREIGN PATENT DOCUMENTS

EP   0 446 979 A1   9/1991

(Continued)

OTHER PUBLICATIONS

Newtown, Harry, *Newton's Telecom Dictionary*, 10th Edition, 1996, 243.

(Continued)

*Primary Examiner*—Wendy R. Garber
*Assistant Examiner*—Hung Q. Dang
(74) *Attorney, Agent, or Firm*—Woodcock Washburn LLP

(57) ABSTRACT

An electronic meter incorporates a TCP/IP protocol suite and an HTTP server to provide two-way access to the meter data. Alternatively, the TCP/IP protocol suite may be incorporated into a gateway serving multiple meters connected through a power line or wireless two-way network. The gateway may incorporate an HTTP server for accessing data from multiple meters and for transmission of data to individual meters. Other aspects of the disclosed system include the use of a common gateway interface for remote access to meter data and to set meter parameters using HTML forms in HTTP browsers; remote reading and setting of multiple meter parameters using a TCP/IP protocol suite; a TCP/IP protocol suite implemented in designated nodes in a CEBus LAN with remote access through TCP/IP to routers and brouters and to individual meters on the LAN; and an SLIP-PPP enabled gateway for remote TCP/IP access through a serial interface to a single or multiple meter parameters.

18 Claims, 5 Drawing Sheets

U.S. PATENT DOCUMENTS

| | | |
|---|---|---|
| 3,858,212 A | 12/1974 | Tompkins et al. .... 343/100 CS |
| 3,878,512 A | 4/1975 | Kobayashi et al. ..... 340/168 R |
| 3,973,240 A | 8/1976 | Fong ......................... 340/151 |
| 4,031,513 A | 6/1977 | Simciak .................. 340/152 T |
| 4,056,107 A | 11/1977 | Todd et al. .................... 130/27 |
| 4,066,964 A | 1/1978 | Costanza et al. ............. 325/55 |
| 4,132,981 A | 1/1979 | White ....................... 340/203 |
| 4,190,800 A | 2/1980 | Kelly, Jr. et al. ............. 325/37 |
| 4,204,195 A | 5/1980 | Bogacki .................... 340/151 |
| 4,218,737 A | 8/1980 | Buscher et al. ............. 364/493 |
| 4,250,489 A | 2/1981 | Dudash et al. ............. 340/147 |
| 4,254,472 A | 3/1981 | Juengel et al. ............. 364/900 |
| 4,319,358 A | 3/1982 | Sepp ............................. 375/1 |
| 4,321,582 A | 3/1982 | Banghart .................... 340/310 |
| 4,322,842 A | 3/1982 | Martinez ..................... 370/204 |
| 4,328,581 A | 5/1982 | Harmon et al. ................ 371/8 |
| 4,361,851 A | 11/1982 | Asip et al. ..................... 358/84 |
| 4,361,890 A | 11/1982 | Green, Jr. et al. ............... 375/1 |
| 4,396,915 A | 8/1983 | Farnsworth et al. ... 340/870.03 |
| 4,405,829 A | 9/1983 | Rivest et al. ............. 178/22.14 |
| 4,415,896 A | 11/1983 | Allgood ................. 340/870.03 |
| 4,466,001 A | 8/1984 | Moore et al. ......... 340/825.08 |
| 4,504,831 A | 3/1985 | Jahr et al. .............. 340/870.03 |
| 4,506,386 A | 3/1985 | Ichikawa et al. ........... 455/343 |
| 4,513,415 A | 4/1985 | Martinez ..................... 370/92 |
| 4,525,861 A | 6/1985 | Freeburg ..................... 455/33 |
| 4,600,923 A | 7/1986 | Hicks et al. ............ 340/870.02 |
| 4,608,699 A | 8/1986 | Batlivala et al. ............. 375/216 |
| 4,611,333 A | 9/1986 | McCallister et al. ........... 375/1 |
| 4,614,945 A | 9/1986 | Brunius et al. ........ 340/870.03 |
| 4,617,566 A | 10/1986 | Diamond ............... 340/870.11 |
| 4,628,313 A | 12/1986 | Gombrich et al. ..... 340/870.02 |
| 4,631,538 A | 12/1986 | Carreno ................. 340/870.18 |
| 4,638,298 A | 1/1987 | Spiro ........................ 340/827 |
| 4,644,321 A | 2/1987 | Kennon ..................... 340/310 |
| 4,653,076 A | 3/1987 | Jerrim et al. ................ 375/115 |
| 4,672,555 A | 6/1987 | Hart et al. .................. 700/276 |
| 4,680,704 A | 7/1987 | Konicek et al. ............ 364/525 |
| 4,688,038 A | 8/1987 | Giammarese .......... 340/870.02 |
| 4,692,761 A | 9/1987 | Robinton .................... 340/825 |
| 4,707,852 A | 11/1987 | Jahr et al. .................... 379/107 |
| 4,713,837 A | 12/1987 | Gordon ......................... 379/93 |
| 4,724,435 A | 2/1988 | Moses et al. ......... 340/870.13 |
| 4,728,950 A | 3/1988 | Hendrickson et al. . 340/870.31 |
| 4,734,680 A | 3/1988 | Gehman et al. ............ 340/539 |
| 4,749,992 A | 6/1988 | Fitzmeyer et al. ..... 340/870.02 |
| 4,757,456 A | 7/1988 | Benghiat .................... 364/464 |
| 4,769,772 A | 9/1988 | Dwyer ....................... 364/300 |
| 4,783,748 A | 11/1988 | Swarztrauber et al. ...... 364/483 |
| 4,792,946 A | 12/1988 | Mayo ......................... 370/338 |
| 4,799,059 A | 1/1989 | Grindahl et al. ........ 340/870.03 |
| 4,804,938 A | 2/1989 | Rouse et al. ................ 340/310 |
| 4,827,514 A | 5/1989 | Ziolko et al. ................. 380/48 |
| 4,839,645 A | 6/1989 | Lill ....................... 340/870.17 |
| 4,841,545 A | 6/1989 | Endo et al. ..................... 375/1 |
| 4,860,379 A | 8/1989 | Schoeneberger et al. ....... 455/5 |
| 4,862,493 A | 8/1989 | Venkataraman et al. .... 379/107 |
| 4,868,877 A | 9/1989 | Fischer ........................ 380/25 |
| 4,884,021 A | 11/1989 | Hammond et al. ......... 324/142 |
| 4,912,722 A | 3/1990 | Carlin ........................... 375/1 |
| 4,922,518 A | 5/1990 | Gordon et al. ............... 379/57 |
| 4,939,726 A | 7/1990 | Flammer et al. ........... 370/94.1 |
| 4,940,974 A | 7/1990 | Sojka .................... 340/825.08 |
| 4,940,976 A | 7/1990 | Gastouniotis et al. .. 340/870.02 |
| 4,958,359 A | 9/1990 | Kato ............................ 375/1 |
| 4,964,138 A | 10/1990 | Nease et al. ................... 375/1 |
| 4,965,533 A | 10/1990 | Gilmore ...................... 331/18 |
| 4,972,507 A | 11/1990 | Lusignan .................... 455/51 |
| 5,018,165 A | 5/1991 | Sohner et al. ................. 375/1 |
| 5,022,046 A | 6/1991 | Morrow, Jr. ................... 375/1 |
| 5,032,833 A | 7/1991 | Laporte ................. 340/825.02 |
| 5,053,766 A | 10/1991 | Ruiz-del-Portal et al. ..................... 340/870.02 |
| 5,053,774 A | 10/1991 | Schuermann et al. .......... 342/44 |
| 5,056,107 A | 10/1991 | Johnson et al. ................. 375/1 |
| 5,067,136 A | 11/1991 | Arthur et al. .................. 375/1 |
| 5,079,715 A | 1/1992 | Venkataraman et al. .... 364/481 |
| 5,086,292 A | 2/1992 | Johnson et al. ............. 340/637 |
| 5,086,385 A | 2/1992 | Launey ...................... 364/188 |
| 5,090,024 A | 2/1992 | Vander Mey et al. ........... 375/1 |
| 5,111,479 A | 5/1992 | Akazawa ....................... 375/1 |
| 5,115,433 A | 5/1992 | Baran et al. ................ 370/94.3 |
| 5,115,448 A | 5/1992 | Mori ............................ 375/1 |
| 5,129,096 A | 7/1992 | Burns .......................... 455/18 |
| 5,132,985 A | 7/1992 | Hashimoto et al. ............ 375/1 |
| 5,136,614 A | 8/1992 | Hiramatsu et al. .............. 375/1 |
| 5,142,694 A | 8/1992 | Jackson et al. ............. 455/67.1 |
| 5,151,866 A | 9/1992 | Glaser et al. ............... 364/483 |
| 5,155,481 A | 10/1992 | Brennan, Jr. et al. ... 340/870.02 |
| 5,160,926 A | 11/1992 | Schweitzer, III ....... 340/870.02 |
| 5,166,664 A | 11/1992 | Fish .......................... 340/539 |
| 5,177,767 A | 1/1993 | Kato ............................. 375/1 |
| 5,179,376 A | 1/1993 | Pomatto ................. 340/870.02 |
| 5,189,694 A | 2/1993 | Garland ..................... 379/106 |
| 5,194,860 A | 3/1993 | Jones et al. ............. 340/870.02 |
| 5,197,095 A | 3/1993 | Bonnet ....................... 379/107 |
| 5,204,877 A | 4/1993 | Endo et al. ..................... 375/1 |
| 5,214,587 A | 5/1993 | Green ................... 364/464.04 |
| 5,225,994 A | 7/1993 | Arinobu et al. ............. 364/492 |
| 5,228,029 A | 7/1993 | Kotzin ..................... 370/95.1 |
| 5,229,996 A | 7/1993 | Bäckström et al. ....... 370/100.1 |
| 5,239,575 A | 8/1993 | White et al. ................ 379/107 |
| 5,239,584 A | 8/1993 | Hershey et al. .............. 380/28 |
| 5,243,338 A | 9/1993 | Brennan, Jr. et al. ... 340/870.02 |
| 5,252,967 A | 10/1993 | Brennan et al. ....... 340/870.02 |
| 5,260,943 A | 11/1993 | Comroe et al. ............ 370/95.1 |
| 5,270,704 A | 12/1993 | Sosa Quintana et al. ..................... 340/870.02 |
| 5,280,498 A | 1/1994 | Tymes et al. ................... 375/1 |
| 5,280,499 A | 1/1994 | Suzuki .......................... 375/1 |
| 5,285,469 A | 2/1994 | Vanderpool ................... 375/1 |
| 5,287,287 A | 2/1994 | Chamberlain et al. ....... 364/483 |
| 5,289,497 A | 2/1994 | Jacobson et al. ............... 375/1 |
| 5,295,154 A | 3/1994 | Meier et al. ................... 375/1 |
| 5,307,349 A | 4/1994 | Shloss et al. ............... 370/85.2 |
| 5,311,541 A | 5/1994 | Sanderford, Jr. .............. 375/1 |
| 5,311,542 A | 5/1994 | Eder .............................. 375/1 |
| 5,315,531 A | 5/1994 | Oravetz et al. ............. 364/550 |
| 5,319,679 A | 6/1994 | Bagby ........................ 375/106 |
| 5,329,547 A | 7/1994 | Ling ............................. 375/1 |
| 5,345,225 A | 9/1994 | Davis ......................... 340/635 |
| 5,359,625 A | 10/1994 | Vander Mey et al. .......... 359/1 |
| 5,377,222 A | 12/1994 | Sanderford, Jr. .............. 375/1 |
| 5,381,462 A | 1/1995 | Larson et al. ............... 379/107 |
| 5,383,134 A | 1/1995 | Wrzesinski ................. 364/514 |
| 5,384,712 A | 1/1995 | Oravetz et al. ............. 364/550 |
| 5,387,873 A | 2/1995 | Muller et al. ............... 327/155 |
| 5,390,360 A | 2/1995 | Scop et al. ................ 455/34.2 |
| 5,406,495 A | 4/1995 | Hill ............................ 364/483 |
| 5,416,917 A | 5/1995 | Adair et al. ................. 395/500 |
| 5,420,799 A | 5/1995 | Peterson et al. ............ 364/483 |
| 5,428,636 A | 6/1995 | Meier ......................... 375/202 |
| 5,430,759 A | 7/1995 | Yokev et al. ................ 375/202 |
| 5,432,507 A | 7/1995 | Mussino et al. ........ 340/870.03 |
| 5,432,815 A | 7/1995 | Kang et al. ................. 375/200 |
| 5,438,329 A | 8/1995 | Gastouniotis et al. .. 340/870.02 |
| 5,448,230 A | 9/1995 | Schanker et al. ....... 340/870.03 |
| 5,448,570 A | 9/1995 | Toda et al. ................ 370/95.3 |
| 5,450,088 A | 9/1995 | Meier et al. ................... 342/51 |
| 5,452,465 A | 9/1995 | Geller et al. ................ 395/800 |
| 5,455,533 A | 10/1995 | Köllner ...................... 327/484 |
| 5,455,544 A | 10/1995 | Kechkaylo .................. 332/103 |
| 5,455,569 A | 10/1995 | Sherman et al. ........ 340/825.02 |
| 5,455,822 A | 10/1995 | Dixon et al. .................. 370/18 |

| | | | | | | |
|---|---|---|---|---|---|---|
| 5,457,713 A | 10/1995 | Sanderford, Jr. et al. ... 375/206 | | 5,790,789 A | 8/1998 | Suarez ............ 395/200.32 |
| 5,461,558 A | 10/1995 | Patsiokas et al. ....... 364/145 | | 5,790,809 A | 8/1998 | Holmes ............ 395/200.58 |
| 5,463,657 A | 10/1995 | Rice ...................... 375/200 | | 5,801,643 A | 9/1998 | Williams et al. ....... 340/870.02 |
| 5,473,322 A | 12/1995 | Carney ............... 340/870.02 | | 5,805,712 A | 9/1998 | Davis ...................... 380/50 |
| 5,475,742 A | 12/1995 | Gilbert ............... 379/106 | | 5,808,558 A | 9/1998 | Meek et al. ........... 340/870.01 |
| 5,475,867 A | 12/1995 | Blum .................. 455/53.1 | | 5,809,059 A | 9/1998 | Souissi et al. ............ 375/202 |
| 5,479,442 A | 12/1995 | Yamamoto ............ 375/206 | | 5,822,521 A | 10/1998 | Gartner et al. ........... 395/200.6 |
| 5,481,259 A | 1/1996 | Bane ................ 340/870.03 | | 5,850,187 A | 12/1998 | Carrender et al. ....... 340/10.42 |
| 5,488,608 A | 1/1996 | Flammer, III .......... 370/85.13 | | 5,862,391 A | 1/1999 | Salas et al. ............ 713/300 |
| 5,491,473 A | 2/1996 | Gilbert ............... 340/870.01 | | 5,872,774 A | 2/1999 | Wheatley, III et al. ..... 370/335 |
| 5,493,287 A | 2/1996 | Bane ................ 340/825.52 | | 5,874,903 A | 2/1999 | Shuey et al. ........... 340/870.02 |
| 5,495,239 A | 2/1996 | Ouellette ............ 340/870.02 | | 5,875,183 A | 2/1999 | Nitadori ................ 370/328 |
| 5,497,424 A | 3/1996 | Vanderpool ............. 380/34 | | 5,875,402 A | 2/1999 | Yamawaki ............. 455/502 |
| 5,499,243 A | 3/1996 | Hall .................... 370/85.8 | | 5,884,184 A | 3/1999 | Sheffer ................. 455/521 |
| 5,500,871 A | 3/1996 | Kato et al. ............. 375/208 | | 5,892,758 A | 4/1999 | Argyroudis ............ 370/335 |
| 5,511,188 A | 4/1996 | Pascucci et al. ........... 395/600 | | 5,896,382 A | 4/1999 | Davis et al. ........... 370/401 |
| 5,519,388 A | 5/1996 | Adair, Jr. ............. 340/870.02 | | 5,897,607 A | 4/1999 | Jenney et al. ........... 702/62 |
| 5,521,910 A | 5/1996 | Matthews ............ 370/54 | | 5,898,387 A | 4/1999 | Davis et al. ............ 340/870.02 |
| 5,522,044 A | 5/1996 | Pascucci et al. ........ 395/200.06 | | 5,907,540 A | 5/1999 | Hayashi ................. 370/315 |
| 5,524,280 A | 6/1996 | Douthitt et al. .......... 455/62 | | 5,910,799 A | 6/1999 | Carpenter et al. ........ 345/333 |
| 5,525,898 A | 6/1996 | Lee, Jr. et al. ........... 324/142 | | 5,923,269 A | 7/1999 | Shuey et al. ........... 340/870.02 |
| 5,526,389 A | 6/1996 | Buell et al. ............. 375/200 | | 5,926,103 A | 7/1999 | Petite ................ 340/825.19 |
| 5,528,507 A | 6/1996 | McNamara et al. ........ 364/483 | | 5,926,531 A | 7/1999 | Petite ................... 379/144 |
| 5,528,597 A | 6/1996 | Gerszberg et al. ........ 370/95.3 | | 5,943,375 A | 8/1999 | Veintimilla ........... 375/355 |
| 5,539,775 A | 7/1996 | Tuttle et al. .............. 375/200 | | 5,944,842 A | 8/1999 | Propp et al. ............ 714/701 |
| 5,541,589 A | 7/1996 | Delaney ............... 340/870.02 | | 5,959,550 A | 9/1999 | Giles ................... 340/870.02 |
| 5,544,036 A | 8/1996 | Brown, Jr. et al. ......... 364/145 | | 5,960,074 A | 9/1999 | Clark .................... 379/310 |
| 5,546,424 A | 8/1996 | Miyake ................ 375/206 | | 5,963,146 A | 10/1999 | Johnson et al. .......... 340/870.1 |
| 5,548,527 A | 8/1996 | Hemminger et al. ....... 364/492 | | 5,974,236 A | 10/1999 | Sherman ............. 395/200.51 |
| 5,548,633 A | 8/1996 | Kujawa et al. ............ 379/93 | | 5,986,574 A | 11/1999 | Colton ................. 340/870.02 |
| 5,553,094 A | 9/1996 | Johnson et al. ............. 375/200 | | 6,000,034 A | 12/1999 | Lightbody et al. ......... 713/202 |
| 5,555,508 A | 9/1996 | Munday et al. ............. 364/492 | | 6,028,522 A | 2/2000 | Petite ..................... 340/641 |
| 5,559,870 A | 9/1996 | Patton et al. .............. 379/107 | | 6,034,988 A | 3/2000 | VanderMey et al. ........ 375/202 |
| 5,566,332 A | 10/1996 | Adair et al. ................ 395/600 | | 6,035,201 A | 3/2000 | Whitehead .............. 455/455 |
| 5,572,438 A | 11/1996 | Ehlers et al. ............... 364/492 | | 6,041,056 A | 3/2000 | Bigham et al. ............ 370/395 |
| 5,590,179 A | 12/1996 | Shincovich et al. ........ 379/107 | | 6,061,604 A | 5/2000 | Russ et al. .................. 700/90 |
| 5,592,470 A | 1/1997 | Rudrapatna et al. ......... 370/320 | | 6,067,029 A | 5/2000 | Durston ................. 340/870.03 |
| 5,594,740 A | 1/1997 | LaDue ..................... 379/59 | | 6,073,169 A | 6/2000 | Shuey et al. ............... 709/217 |
| 5,602,744 A | 2/1997 | Meek et al. ............. 364/464.22 | | 6,073,174 A | 6/2000 | Montgomerie et al. ..... 709/224 |
| 5,617,084 A | 4/1997 | Sears ........................ 331/176 | | 6,078,251 A | 6/2000 | Landt et al. ................ 340/10.41 |
| 5,619,192 A | 4/1997 | Ayala ................... 340/870.02 | | 6,078,785 A | 6/2000 | Bush ......................... 455/7 |
| 5,619,685 A | 4/1997 | Schiavone ............... 395/500 | | 6,078,909 A | 6/2000 | Knutson ................... 705/59 |
| 5,621,629 A | 4/1997 | Hemminer .................. 363/56 | | 6,088,659 A | 7/2000 | Kelley et al. ............... 702/62 |
| 5,627,759 A | 5/1997 | Bearden et al. ............. 364/483 | | 6,091,758 A | 7/2000 | Ciccone et al. ............. 375/132 |
| 5,631,636 A | 5/1997 | Bane ................... 340/825.69 | | 6,100,817 A | 8/2000 | Mason, Jr. et al. ..... 340/870.02 |
| 5,640,679 A | 6/1997 | Lundqvist et al. ........... 455/33.2 | | 6,112,192 A | 8/2000 | Capek ....................... 705/59 |
| 5,659,300 A | 8/1997 | Dresselhuys et al. .. 340/870.02 | | 6,128,276 A | 10/2000 | Agee ........................ 370/288 |
| 5,668,803 A | 9/1997 | Tymes et al. ............... 370/312 | | 6,137,423 A | 10/2000 | Glorioso et al. ........ 340/870.02 |
| 5,668,828 A | 9/1997 | Sanderford, Jr. et al. ... 375/202 | | 6,150,955 A | 11/2000 | Tracy et al. ............ 340/870.02 |
| 5,673,252 A | 9/1997 | Johnson et al. ............. 370/449 | | 6,154,487 A | 11/2000 | Murai et al. ................ 375/150 |
| 5,684,472 A | 11/1997 | Bane .................... 340/870.02 | | 6,160,993 A | 12/2000 | Wilson .................... 455/12.1 |
| 5,684,799 A | 11/1997 | Bigham et al. ............. 370/397 | | 6,172,616 B1 | 1/2001 | Johnson et al. ......... 340/870.12 |
| 5,691,715 A | 11/1997 | Ouellette ............... 340/870.09 | | 6,199,068 B1 | 3/2001 | Carpenter .................. 707/100 |
| 5,692,180 A | 11/1997 | Lee ........................ 395/610 | | 6,208,266 B1 | 3/2001 | Lyons et al. ............ 340/870.02 |
| 5,696,501 A | 12/1997 | Ouellette et al. ........ 340/870.02 | | 6,218,953 B1 | 4/2001 | Petite ........................ 340/641 |
| 5,696,765 A | 12/1997 | Safadi ..................... 370/436 | | 6,233,327 B1 | 5/2001 | Petite ........................ 379/155 |
| 5,699,276 A | 12/1997 | Roos .................... 364/514 A | | 6,246,677 B1 | 6/2001 | Nap et al. .................... 370/346 |
| 5,714,931 A | 2/1998 | Petite et al. ................ 340/539 | | 6,249,516 B1 | 6/2001 | Brownrigg et al. ......... 370/338 |
| 5,715,390 A | 2/1998 | Hoffman et al. ........ 395/188.01 | | 6,363,057 B1 | 3/2002 | Ardalan et al. ............. 370/252 |
| 5,717,604 A | 2/1998 | Wiggins .................. 364/514 C | | 6,396,839 B1 * | 5/2002 | Ardalan et al. ............. 370/401 |
| 5,719,564 A | 2/1998 | Sears ................... 340/870.02 | | 6,430,268 B1 | 8/2002 | Petite ......................... 379/39 |
| 5,744,657 A | 4/1998 | Tofte ....................... 364/510 | | 6,437,692 B1 | 8/2002 | Petite et al. ................ 340/540 |
| 5,745,901 A | 4/1998 | Entner et al. .............. 707/103 | | 6,446,192 B1 | 9/2002 | Narasimhan et al. ......... 712/29 |
| 5,748,104 A | 5/1998 | Argyroudis et al. ... 340/870.11 | | 6,643,278 B1 | 11/2003 | Panasik et al. ............. 370/330 |
| 5,748,619 A | 5/1998 | Meier ...................... 370/278 | | 6,684,245 B1 | 1/2004 | Shuey et al. ................ 709/223 |
| 5,751,914 A | 5/1998 | Coley et al. ................. 395/51 | | 6,747,981 B1 * | 6/2004 | Ardalan et al. ............. 370/401 |
| 5,751,961 A | 5/1998 | Smyk .................... 395/200.47 | | 6,751,563 B1 | 6/2004 | Spanier et al. .............. 702/61 |
| 5,754,772 A | 5/1998 | Leaf ...................... 395/200.33 | | 2001/0002210 A1 | 5/2001 | Petite ........................ 379/155 |
| 5,754,830 A | 5/1998 | Butts et al. .................. 395/500 | | 2001/0024163 A1 | 9/2001 | Petite ........................ 340/628 |
| 5,757,783 A | 5/1998 | Eng et al. .................. 370/315 | | 2002/0012323 A1 | 1/2002 | Petite et al. ................ 370/252 |
| 5,768,148 A | 6/1998 | Murphy et al. ............. 364/492 | | 2002/0013679 A1 | 1/2002 | Petite ........................ 702/188 |
| 5,778,368 A | 7/1998 | Hogan et al. ................ 707/10 | | 2002/0019712 A1 | 2/2002 | Petite et al. ................ 702/61 |
| 5,787,437 A | 7/1998 | Potterveld et al. .......... 707/103 | | 2002/0019725 A1 | 2/2002 | Petite ........................ 702/188 |

| | | | |
|---|---|---|---|
| 2002/0027504 A1 | 3/2002 | Davis et al. | 340/540 |
| 2002/0031101 A1 | 3/2002 | Petite et al. | 370/310 |
| 2002/0125998 A1 | 9/2002 | Petite et al. | 340/286.01 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0202512 A1 | 10/2003 | Kennedy | 370/389 |
| 2004/0113810 A1 | 6/2004 | Mason, Jr. et al. | 340/870.02 |

FOREIGN PATENT DOCUMENTS

| | | |
|---|---|---|
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 2 237 910 A | 5/1991 |
| JP | 02-67967 A | 3/1990 |
| JP | 4290593 A | 10/1992 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998:—Mobitex®: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," ARDIS, Sep. 23, 1998.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

"MV-90 Read Only System" UTS Software Solutions For Utility Customers. (No Date). (No Page Numbers or Pages).

Rappaport, T. S., "Wireless Communications, Principles and Practice," Prentice Hall PTR, 1996, pp. 410-413.

Brochure: TRF6900 Single-Chip RF Transceiver, Texas Instrument, 2001 ©.

Johnson, D.B., "Routing in Ad Hoc Networks of Mobile Hosts", *IEEE*, 1995, 158-163.

Jubin, J. et al., "The DARPA Packet Radio Network Protocols", *Proceedings of the IEEE*, 1987, 75(1), 21-32.

Corcoran, P.M. et al., "CEBus Network Access via the World-Wibe-Web," *International Conference on Consumer Electronics*, Jun. 5-7, 1996, 236-237.

Corcoran, P.M. et al., "Browser-Style Interfaces to a Home Automation Network," *IEEE Trans. on Consumer Electronics*, Nov. 1, 1997, 43(4), 1063-1069.

Newton, H, *Newton's Telecom Dictionary*, Flatiron Publishing, Inc., 10th Ed., 1996, pages.: LAN (1 of 1); Cebus Overview (1-3), Cebus Industry Council (1 of 1).

Markwalter, Brian, et al., "CEBus Network Layer Description", *IEEE*, 1989, 571-575.

Desbonnet, Joe et al., "System Architecture and Implementation of a CEBus/Internet Gateway", *IEEE*, 1997, 1057-1062.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN*, The National Research and Education Network, 1990, 55-63.

Brownrigg, E.B., "The Internet as an External Economy: The Emergence of the Invisible Hand", *Library Administration and Management*, 1991, 95-97.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

Jubin, J., "Current Packet Radio Networks Protocols", *IEEE Infocom Proceedings*, 1985, 86-92.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *Proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "The Telecommunications Landscape", 1986, 7 pages.

Lynch, C.A. et al., "Routing, Repeating, Power Control and Directional Techniques", *Packet Radio Networks*, Architectures, Protocols, Technologies and Applications, 1987, Ch 5, 105-129, 259-274.

MacGregor, W. et al., "Multiple Control Stations in Packet Radio Networks", *IEEE Military Communications Conference*, 1982, 10.3-1-10.3-5.

Shachan, N. et al., "A Packet Radio Network for Library Automation", *IEEE Military Communications Conference*, 1987, 2, 21.3. 1-21.3.7.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238.

Wescott, J. et al., "A Distributed Routing Design for a Broadcast Environment", *IEEE Military Communications Conference*, 1982, 10.4-1-10.4-5.

"Packet Radio: Applications for Libraries in Developing Countries", *UDT Series on Data Communication Technologies and Standards for Libraries*, 1993, Ch 1-6, 87 pages.

\* cited by examiner

REMOTE ACCESS TO ELECTRONIC METERS USING A TCP/IP PROTOCOL SUITE

CROSS-REFERENCE TO RELATED APPLICATIONS

This application is a CON of Ser. No. 09/975,582 filed Oct. 10, 2001 now U.S. Pat. No. 6,747,981 which is a CON of Ser. No. 09/022,718 filed Feb. 12, 1998 now U.S. Pat. No. 6,396,839.

FIELD OF THE INVENTION

The present invention relates generally to electronic meters and automatic meter reading, and more particularly to TCP/IP-enabled electronic meters for remote two-way access over local area networks and wide area networks.

BACKGROUND OF THE INVENTION

The present invention relates to automatic meter reading (AMR) systems for use in automatically reading electrical energy and other utility meters (e.g., water and gas meters). The invention is more particularly intended for, although not limited to, use in an electronic meter. Further background information on electronic meters can be found in U.S. Pat. No. 5,548,527, Aug. 20, 1996, titled "Programmable Electrical Energy Meter Utilizing a Non-Volatile Memory" (assigned to ABB Power T&D Company Inc.) Further background on automatic meter reading systems can be found in U.S. Pat. No. 5,553,094, Sep. 3, 1996, titled "Radio Communication Network for Remote Data Generating Stations."

SUMMARY OF THE INVENTION

The present invention, as discussed in greater detail below, involves the use of a TCP/IP protocol suite and a hypertext transfer protocol (HTTP) server. The terms "HTTP" and "TCP/IP" are well known in the networking and telecommunications arts. For example, TCP/IP refers to a well known set of protocols for linking dissimilar devices across networks. The invention also involves the use of a "gateway". A gateway is a node in a network that connects two otherwise incompatible networks. Gateways may perform code and protocol conversion processes. A "protocol" is a set of rules or procedures relating to the format and timing of data transmissions between two devices. Protocols typically break a file into equal-size blocks or packets. These are sent and the receiving device uses a mathematical procedure to determine whether the block or packet was received accurately.

An electronic metering system in accordance with the present invention comprises a wide area network (WAN) operating in accordance with a TCP/IP protocol; a local area network (LAN) comprising a plurality of meters each of which includes meter electronics for measuring a prescribed quantity supplied by a utility and memory for storing measured data and meter control parameters; a gateway operatively coupled to the LAN and the WAN; and an HTTP server operatively coupled to the LAN and the gateway, whereby the WAN is provided remote access to the measured data and control parameters of the meters.

Presently preferred embodiments of the invention further include a CGI (common gateway interface) application coupled to the HTTP server for use in accessing the measured data. Alternatively, the inventive system may include a virtual machine coupled to the HTTP server for use in accessing the data.

The prescribed quantity is preferably electricity, water or gas.

The HTTP server and CGI application may be embedded in each of the meters or, alternatively, embedded in the gateway.

Other features of the present invention are disclosed below.

DETAILED DESCRIPTION OF ILLUSTRATIVE EMBODIMENTS

The present invention, in one embodiment, employs an electronic meter incorporating a TCP/IP protocol suite and an HTTP server for two-way access to the meter data. In another embodiment of the invention, the TCP/IP protocol suite is incorporated into a gateway serving multiple meters connected through a power line or wireless two-way network. The gateway employed in a second embodiment of the present invention incorporates an HTTP server for accessing data from multiple meters and for transmission of data to individual meters.

Figure 1:
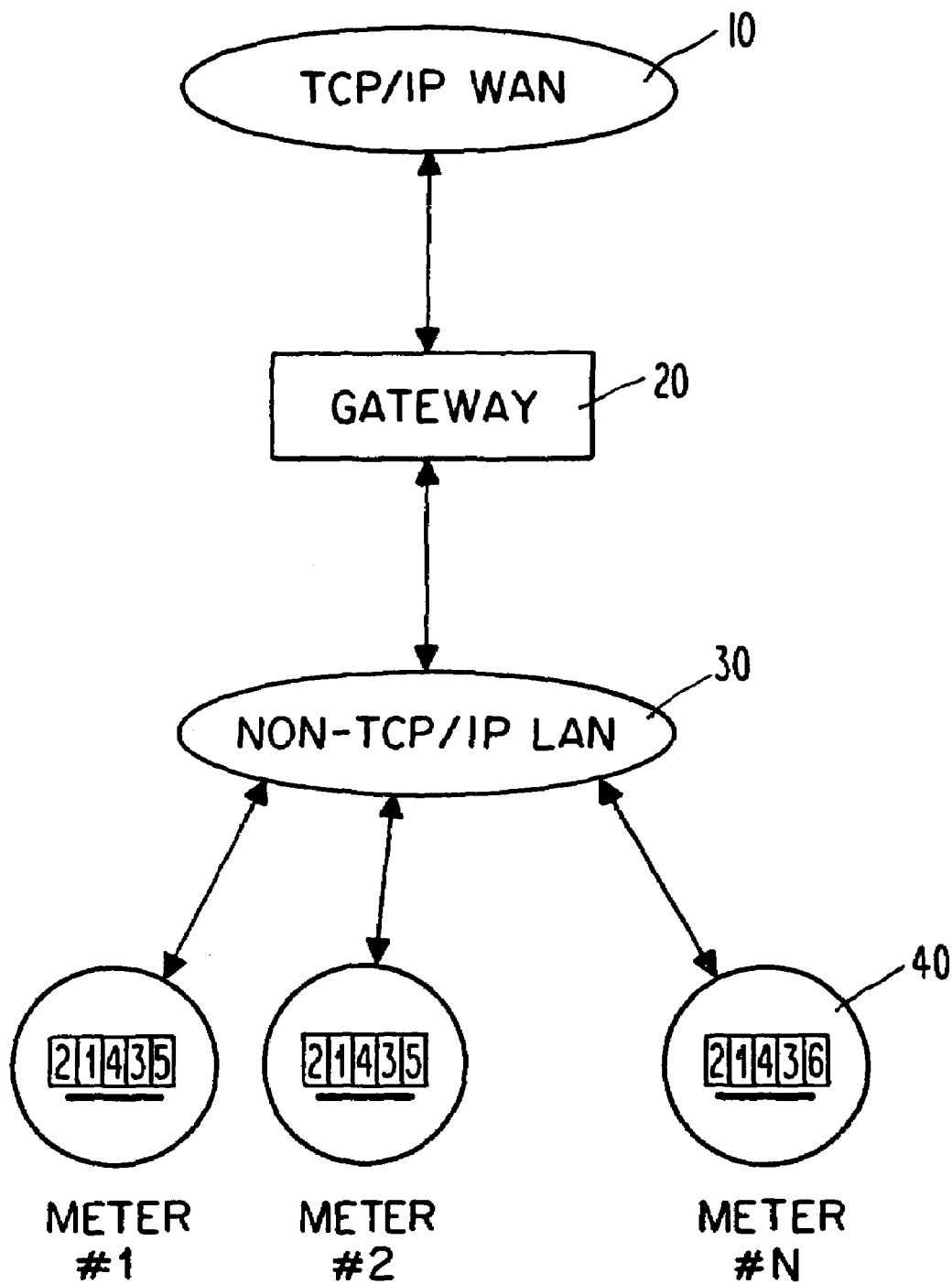
FIG. 1 schematically depicts an AMR network comprising a wide area network 10, gateway 20, local area network 30 and meters 40, in accordance with the present invention.

The basic architecture of the present invention is shown in FIG. 1. As mentioned, embedding an HTTP server and a TCP/IP protocol stack within a meter 40 or a gateway 20 to multiple meters through a local area network (LAN) 30 enables remote access to meter parameters on a continuous basis. As shown, a set of N meters 40 communicate through a non-TCP/IP type of LAN 30. The LAN 30 may be, e.g., a CEBus network employing power line or radio frequency communications (the Consumer Electronics Bus (CEBus) protocol has been adopted as an Electronics Industry Association standard (EIA IS-60), and defines a LAN that uses multiple media, including power line, radio, twisted pair, coaxial cable, and infrared signaling). Also connected to the LAN 30 is a gateway 20 that is also connected to a TCP/IP wide-area network (WAN) 10. Other applications (not shown) are also connected to the TCP/IP WAN 10 and may need to access the individual meters or groups of meters. These applications access individual meters by sending commands contained in packets with attached TCP/IP destination addresses that are unique to each meter.

In the first implementation of the invention (FIG. 2), the gateway 20 receives packets from other applications on the WAN 10. The gateway 20 includes a TCP/IP interface 22 and a LAN interface 28. The LAN interface 28 includes software for transforming the data packets into the format required for transmission on the LAN 30. The gateway 20 then transmits these reformatted packets over the LAN 30 to the meters 40. The steps involved in this transformation are:

1. The gateway examines the TCP/IP address of the packet and determines if it is the address of a meter or meters within the set attached to the gateway through its LAN. If not, the packet is ignored.

2. If the packet is intended for one of the meters on the gateway's LAN, the gateway examines the meter TCP/IP address attached to the packet and determines if it is an individual meter address or a broadcast address.

3. If the packet is addressed to an individual meter, then the gateway encapsulates the packet into a larger packet that is addressed to the meter using its unique LAN address (which is different from its TCP/IP address).

4. If the packet is meant for broadcast to all the meters, then the gateway encapsulates the packet into a larger packet addressed to the special broadcast address of the LAN (which is different from the TCP/IP broadcast address).

5. If the packet is larger than the maximum allowable packet size for the LAN, then the gateway segments the packet into smaller pieces. Each piece is labeled with the same LAN address as the original, larger packet.

6. Each piece of the segmented packet is transmitted onto the LAN for reception by one or more of the meters. The gateway is responsible for receiving acknowledgments of packet receptions from the meters, and for retransmitting packets if they are not received.

Each individual meter listens on the LAN for packets. A meter reconstitutes the original TCP/IP WAN packet from one or more LAN packets, and then executes the commands contained in the packet and sends the results back to the gateway. The steps involved in this process are:

1. The meter examines the LAN address of the packet to see if it is intended for this meter or is a broadcast address. If the address is neither of these, the meter ignores the packet.

2. If the packet is specifically addressed for the meter, an acknowledgment of reception is sent back to the gateway. If an error is found in the packet, a negative acknowledgment is sent back to the gateway. For broadcast transmissions, no acknowledgment is sent.

3. The received packet is appended to any previously received pieces of the larger segmented packet. When all of the pieces of the segmented packet are received, the entire original TCP/IP packet is extracted and sent to the TCP/IP interface software, in the meter.

4. The TCP/IP interface software examines the packet to see what service is being requested. In this case, assume the packet is intended for servicing by the HTTP server. (It is possible that there could be other servers running on the meter to which TCP/IP messages could be sent.)

5. The HTTP server examines the data packet to see what operation is being requested. In this case, assume that the packet contains a request that an application program be run on the meter to extract its current reading and send it back to the originator of the request. The HTTP server will initiate this application through the CGI.

6. The CGI application will query the meter application software to find the current reading. The meter application directly accesses the meter electronics to get the required information. The reading is passed back to the CGI application, which writes the reading into a message using HTML. The HTML message is sent back lo the HTTP server.

7. The HTTP server encodes the HTML message as a TCP/IP packet and sends it on to the meter's TCP/IP interface.

8. The meter's TCP/IP interface sends the packet to the gateway using the same set of steps that the gateway used to send the original request to the meter.

9. Once the gateway receives the TCP/IP packet from the meter, it retransmits the packet onto the WAN where the originating application for the command can receive it.

Figure 2:
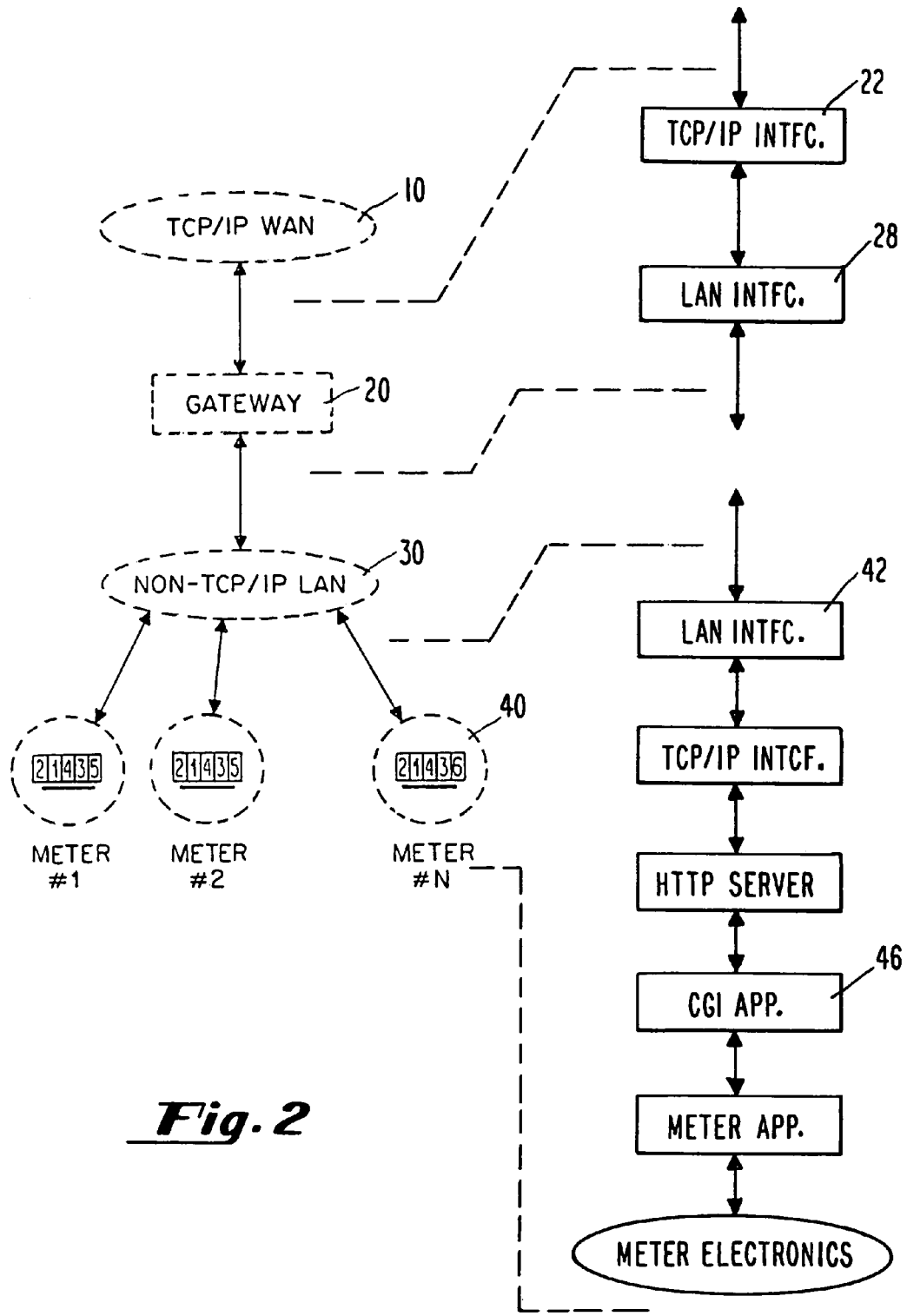
FIG. 2 schematically depicts an embodiment of the present invention in which an HTTP server and a common gateway interface are located in the meter(s) 40.
Figure 3:
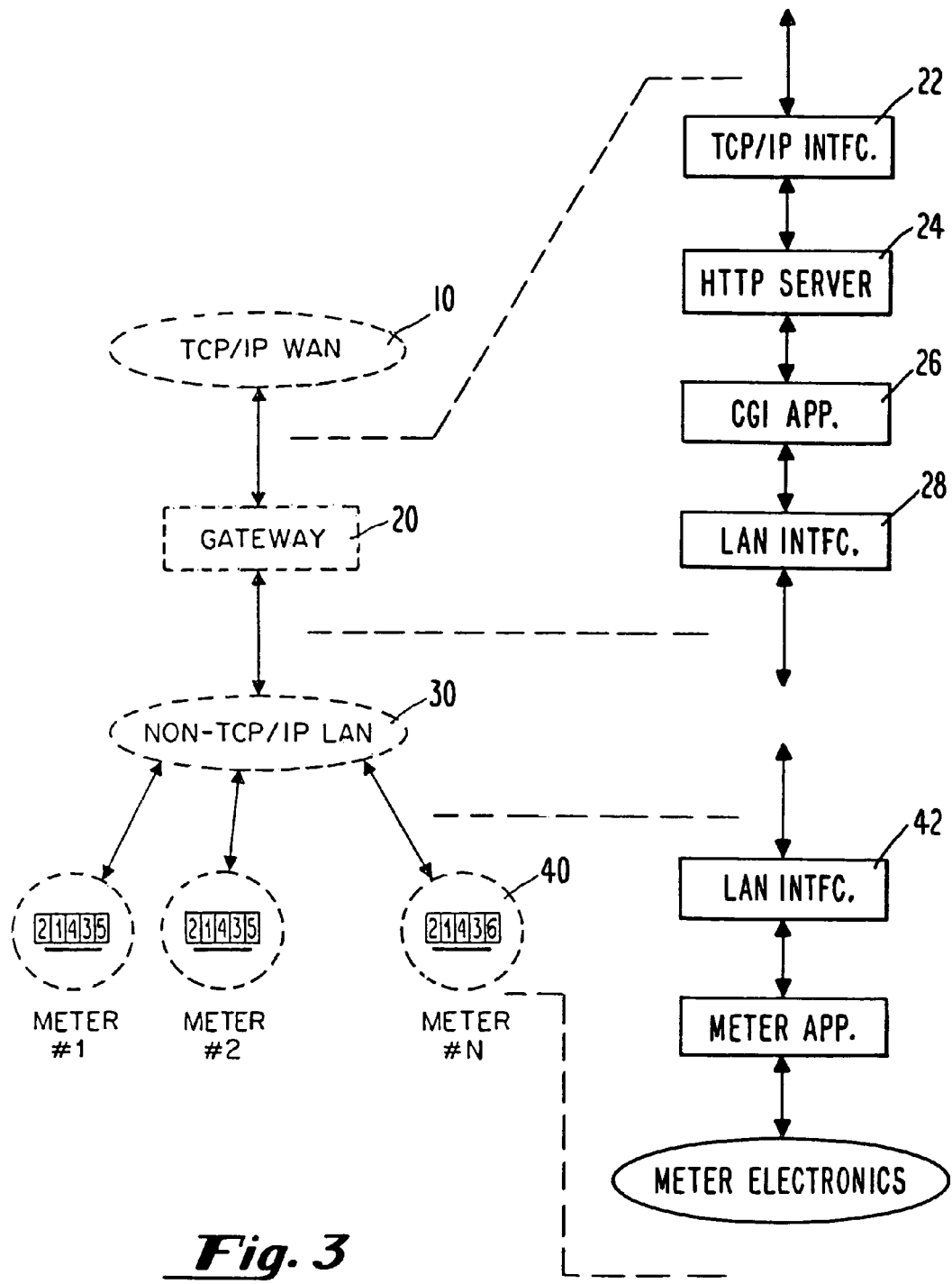
FIG. 3 schematically depicts an embodiment of the present invention in which an HTTP server and a common gateway interface are located in the gateway 20.

In the second embodiment of the invention (FIG. 3), the gateway assumes most of the tasks assigned to the meters in the first embodiment (FIG. 2). The HTTP server 24 and CGI application 26 are moved to the gateway 20, and the meters retain only their interface 42 to the non-TCP/IP LAN. The processing of packets received from the WAN 10 proceeds as follows:

1. The gateway examines the TCP/IP address of the packet and determines if it is the address of a meter or meters within the set attached to the gateway through its LAN. If not, the packet is ignored.

2. The TCP/IP interface software examines the packet to see what service is being requested. In this case, assume the packet is intended for servicing by the HTTP server now contained in the gateway. (It is possible that there could be other server applications running on the meter to which TCP/IP messages could be sent.)

3. The HTTP server examines the data packet to see what operation is being requested. In this case, assume that the packet contains a request that an application program be run to get the current reading of an individual meter and send it back to the originator of the request. The HTTP server will initiate this application through the CGI (26).

4. The CGI application 26 now runs within the gateway. It must determine the LAN address of the specified meter and send a command packet to it over the LAN.

5. The command is received by the meter and causes the meter application to query the electronics to find the current reading.

6. The meter reading is encapsulated into a LAN packet and sent back to the gateway.

7. The CGI application receives the LAN packet from the meter and extracts the meter reading. The reading is written into an HTML message and is sent back to the HTTP server.

8. The HTTP server encodes the HTML message as a TCP/IP packet and sends it on to the gateway's TCP/IP interface 22.

9. The gateway's TCP/IP interface 22 sends the packet onto the WAN 10 where the originating application for the command can receive it.

Figure 4:
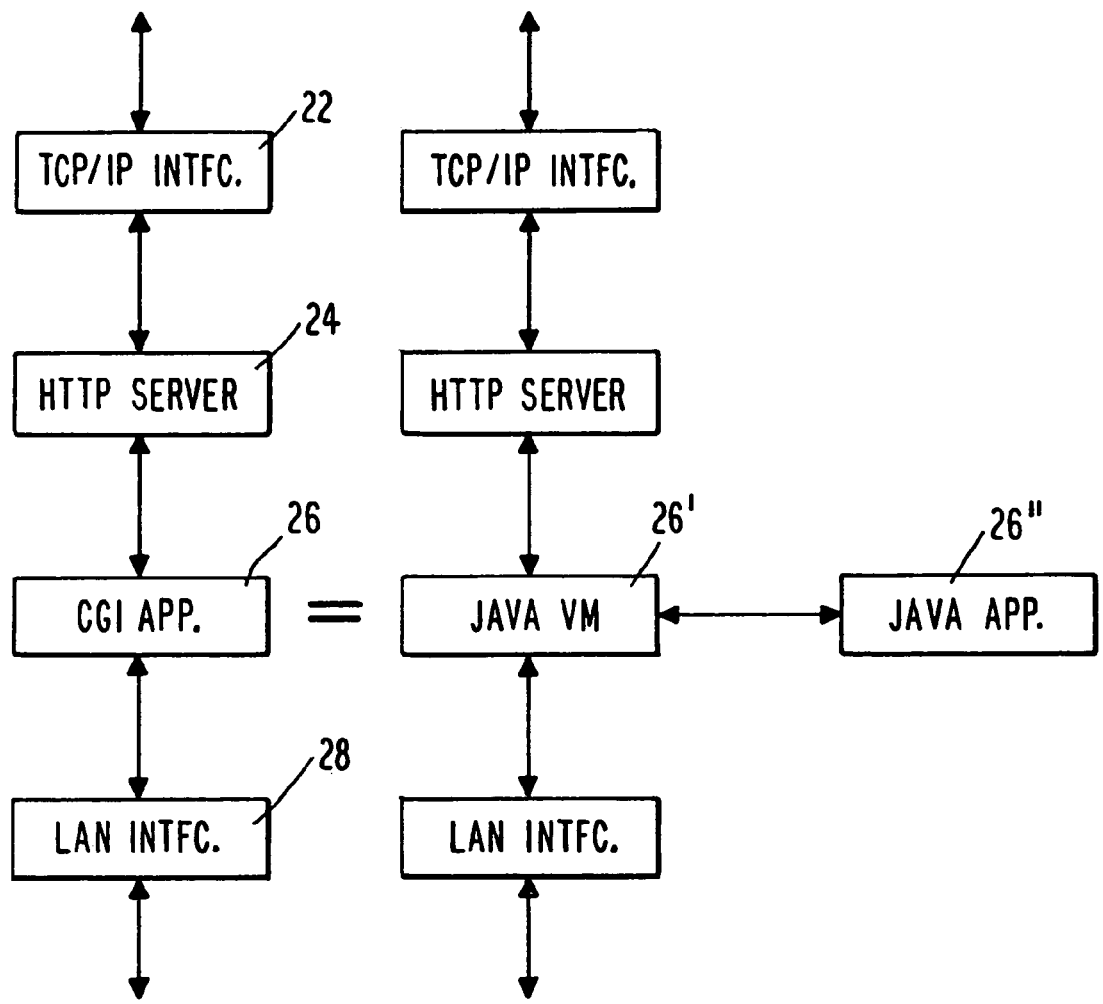
FIG. 4 illustrates how the common gateway interface could be replaced by a Java virtual machine and a Java applet.

Both implementations of the present invention have been described as using CGI applications 46, 26 to handle the details of accessing the current reading for a meter. As shown in FIG. 4, the CGI application could be replaced by a Java virtual machine (VM) 26' running a Java application 26" that performs the same operations as the CGI application.

In addition, both implementations have been described using an example where the current reading of an individual meter is requested by an application connected to the WAN. An application on the WAN can also write data to a meter or meters using similar procedures. The data could modify parameters affecting the operations of the meter or meters. An example would be rate updates.

Either implementation, with their use of TCP/IP and HTTP servers, supports the reading of meters or setting their parameters using browsers such as a Netscape™ or Explorer™. Utilities and homeowners could perform remote on-demand meter reading via their browsers. An individual meter or group of meters could be accessed as if the meter(s) were a web site and their current readings or other data could be displayed on the browser. The meters could send forms to the browser that the user could fill in to change parameters in the meters. Both reading and updating the meters would be protected by encryption and passwords.

Figure 5:
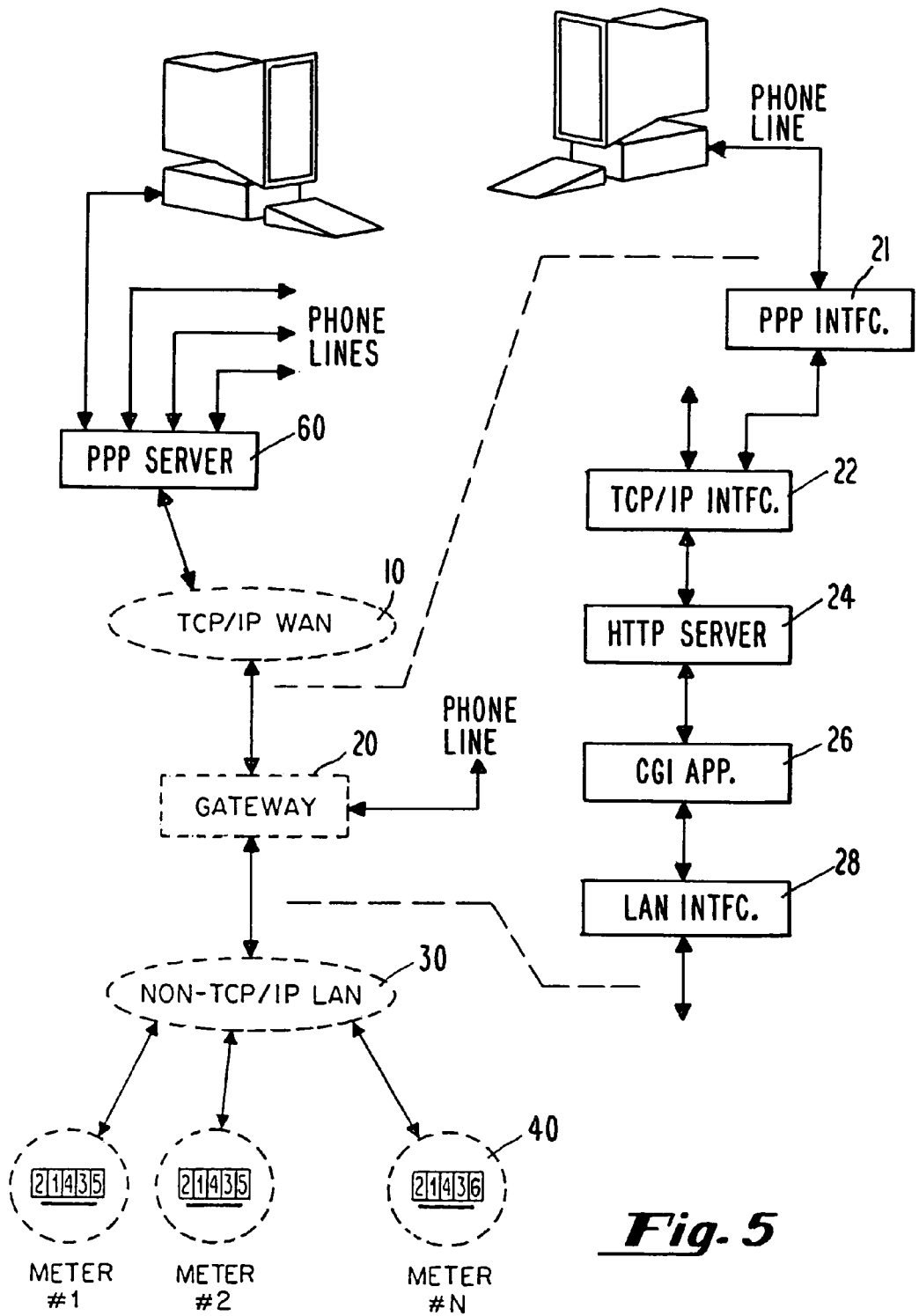
FIG. 5 portrays an embodiment of the invention in which one or more computers are given access to the meters by way of a PPP server or interface.

As shown in FIG. 5, a browser could gain access to the meters through a phone line to a Point-to-Point Protocol (PPP) server 60 attached to the WAN 10 or attached directly to a gateway 20. The PPP server interfaces with modems (not shown) to provide a TCP/IP link to a browser on the other end of the line. The PPP server sends the packets from the phone line onto the WAN where they are received by the appropriate gateway. In the case of a phone line connection directly to a gateway, the PPP software includes an interface 21 for directly connecting to the TCP/IP WAN interface 22 so that the packets received over the phone line are handled in the same way as packets received over the WAN 10.

The browser may be replaced by an intelligent application program that accesses the HTTP server for automated meter reading and parameter setting on a scheduled and repetitive basis. The application uses the meter readings to create or update records in a database. This application could be a Java application which can interact with the HTTP servers and databases that support the HTTP protocols.

In sum, the present invention includes the following novel aspects: (1) Embedded HTTP server in a meter for on-demand access to meter data and for remotely setting meter parameters; (2) Embedded HTTP server in a gateway to multiple meters to read and set parameters in individual meters on a LAN; (3) Using CGI for remote access to meter data and to set meter parameters using HTML forms in HTTP browsers; (4) Remote reading and setting of multiple meter parameters using TCP/IP protocol suite; (5) TCP/IP protocol suite implemented in designated nodes in a CEBus LAN including CEBus routers and brouters with remote access through TCP/IP to the router/brouter and, therefore, individual meters on a LAN; (6) SLIP-PPP enabled gateway for remote TCP/IP access through a serial interface (phone line, or ISDN, for example) to a single or multiple meter parameters (setting and reading).

The foregoing detailed description of preferred embodiments of the invention is not meant to limit the scope of protection of the following claims. Those skilled in the art of electronic metering will recognize that many modifications may be made to the presently preferred and specifically described embodiments without departing from the true spirit of the invention.

What is claimed:

1. An electronic metering system, comprising:
   (A) a wide area network (WAN) operating in accordance with a TCP/IP protocol;
   (B) a local area network (LAN) comprising a plurality of meters each of which includes meter electronics for measuring a prescribed commodity supplied by a utility and memory for storing measured data and meter control parameters;
   (C) a gateway operatively coupled to said LAN and said WAN; and
   (D) a server operatively coupled to said LAN and said gateway, whereby said WAN is provided remote access to said measured data and control parameters of said meters.

2. A system as recited in claim 1, further comprising a common gateway interface (CGI) application coupled to said server for use in accessing said measured data.

3. A system as recited in claim 2, wherein said server and said CGI application are embedded in each of said meters.

4. A system as recited in claim 3, wherein each of said meters further comprises a TCP/IP interface.

5. A system as recited in claim 2, wherein said server and said CGI application are embedded in said gateway.

6. A system as recited in claim 1, further comprising a virtual machine coupled to said server for use in accessing said data.

7. A system as recited in claim 1, wherein each of said meters further comprises a LAN interface.

8. A system as recited in claim 1, wherein said gateway comprises a LAN interface.

9. A system as recited in claim 1, wherein said gateway comprises a TCP/IP interface.

10. A system as recited in claim 1, further comprising a common gateway interface (CGI) application coupled to said server for use in accessing said measured data; wherein said server and CGI application are embedded in each of said meters; wherein said gateway and each of said meters comprises a LAN interface and a TCP/IP interface; and wherein said prescribed commodity is a member of the group consisting of electricity, water and gas.

11. A system as recited in claim 1, further comprising a common gateway interface (CGI) application coupled to said server for use in accessing said measured data; wherein said server and CGI application are embedded in said gateway; wherein each of said meters and said gateway comprises a LAN interface; wherein said gateway further comprises a TCP/IP interface; and wherein said prescribed commodity is a member of the group consisting of electricity, water and gas.

12. An electronic meter, comprising:
   meter electronics for measuring a prescribed commodity supplied by a utility;
   a memory for storing measured data and meter control parameters; and
   a server operatively coupled to said meter electronics and memory;
   said electronic meter being configured for use in a system including a wide area network (WAN) operating in accordance with a TCP/IP protocol, a local area network (LAN), and a gateway operatively coupled to said LAN and said WAN,
   whereby said WAN is provided with remote access to said measured data and control parameters of said electronic meter.

13. An electronic meter as recited in claim 12, further comprising a LAN interface and a TCP/IP interface operating in the meter.

14. An electronic meter as recited in claim 12, further comprising a common gateway interface (CGI) application and a meter application operating in the meter.

15. A gateway for use in a system comprising an electronic meter connected to a local area network (LAN), the gateway, and a wide area network (WAN) operating in accordance with a TCP/IP protocol, wherein the electronic meter is operatively coupled to the WAN through the gateway, the gateway comprising:
   a server embedded in the gateway and operatively coupled to said electronic meter, whereby said WAN is provided with remote access, via the gateway to measured data and control parameters of the electronic meter.

16. A gateway is recited in claim 15, further comprising a LAN interface and a TCP/IP interface embedded in the gateway.

17. A gateway as recited in claim 15, further comprising a common gateway interface (CGI) application operating in the gateway.

18. A method for operating an electronic metering system, comprising:
(A) providing a wide area network (WAN) operating in accordance with a TCP/IP protocol;
(B) coupling the WAN to a local area network (LAN) comprising a plurality of meters each of which includes meter electronics for measuring a prescribed commodity supplied by a utility and memory for storing measured data and meter control parameters;
(C) providing a server operatively coupled to said LAN; and
(D) providing said WAN with remote access to said measured data and control parameters of said meters.

* * * * *